United States Patent [19]

Hirano et al.

[11] Patent Number: 4,934,812
[45] Date of Patent: Jun. 19, 1990

[54] LIGHT DETECTOR

[75] Inventors: Satoshi Hirano; Yoshio Horikawa, both of Tokyo, Japan

[73] Assignee: Tokyo Kogaku Kikai Kabushiki Kaisha, Tokyo, Japan

[21] Appl. No.: 17,616

[22] Filed: Feb. 24, 1987

[30] Foreign Application Priority Data

Feb. 25, 1986 [JP] Japan .................................. 61-39492

[51] Int. Cl.⁵ .......................... G01B 11/26; G01C 3/08
[52] U.S. Cl. ........................................ 356/152; 356/4; 356/400; 250/239; 33/293
[58] Field of Search ...................... 33/293; 356/4, 152, 356/400; 250/239

[56] References Cited

U.S. PATENT DOCUMENTS 4,674,870 6/1987 Cain et al. ................................. 356/4
4,676,634 6/1987 Petersen ................................. 356/4

Primary Examiner—Stephen C. Buczinski
Attorney, Agent, or Firm—Finnegan, Henderson, Farabow, Garrett & Dunner

[57] ABSTRACT

A light detector is disclosed which comprises a light-receiving section adapted to receive a measuring light beam at a front face thereof and to photoelectrically convert the light beam thus received and a display section adapted to display a measurement result on the basis of an output from the light-receiving section. The display section is constituted by a pair of display segments each having at least one displaying face on a respective one of side faces which are formed on opposed sides of the light-receiving section sandwiching it therebetween and are inclined with respect to the front face in such a direction that back faces thereof approach to each other.

4 Claims, 3 Drawing Sheets

LIGHT DETECTOR

BACKGROUND OF THE INVENTION

(1) Field of the Invention

The present invention relates to a light detector which comprises a light-receiving section adapted to receive, for instance, measuring light of a laser beam and a display section for displaying a measurement result on the basis of a signal from the light-receiving section.

(2) Related Art Statement

Light detectors have been heretofore applied in a variety of fields, which are constituted such that light rays are photoelectrically detected and a measurement result is displayed to measure the intensity of the light, a light-projected location, etc. For example, light detectors have widely been used in a surveying field, which are constructed such that a laser beam is ejected from a surveying instrument body and received at an object to be measured, and the center of the laser beam-projected location is located. In the light detectors of this kind, the light-receiving section for receiving the light and the display section for displaying the measurement results on the basis of a signal from the light-receiving section are ordinarily arranged together in the same plane.

However, since the display section for displaying the measurement result and the light-receiving section are arranged in the same plane in the conventional light detectors thus constituted, a surveying person is required to stand exactly opposed to the display section to accurately read the measurement result. As a result, there occured an extremely inconvenient problem that the measuring light entering the light-receiving section is interrupted by the surveying person himself.

SUMMARY OF THE INVENTION

The present invention has been accomplished to solve the problem encountered by the above-mentioned conventional technique.

More particularly, it is an object of the present invention to provide a light detector comprising a light-receiving section adapted to receive a measuring light beam at a front face thereof and photoelectrically convert the light beam thus received and a display section adapted to display a measurement result on the basis of an output from the light-receiving section, said display section being constituted by a pair of displaying segments each having at least one displaying face on a respective one of side faces which are formed on opposite side faces of the light-receiving section sandwiching it therebetween and are inclined with respect to the front face in such a direction that back faces thereof approach to each other.

By such a construction, according to the present invention, the measurement result can be always accurately read without the light beam entering the light-receiving section being interrupted.

These and other objects, features, and advantages of the present invention will be appreciated upon reading of the invention when taken in conjunction with the attached drawings with the understanding that some modifications, variations, and changes of the same could be made by a skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

According to the present invention, since the displaying face of a pair of the displaying faces of the display sections are formed on the side faces located sandwiching the light-receiving section therebetween and the opposite side faces are slightly inclined with respect to the face including the light-receiving section in such a manner that their back faces approach to each other toward the face including the light-receiving section, the displaying faces of the display section are substantially continued to the light-receiving face and located obliquely rearward thereof. Accordingly, a surveying person can accurately read the measurement result from the oblique sode without facing exactly opposed to the front face every measurement.

Figure 3:
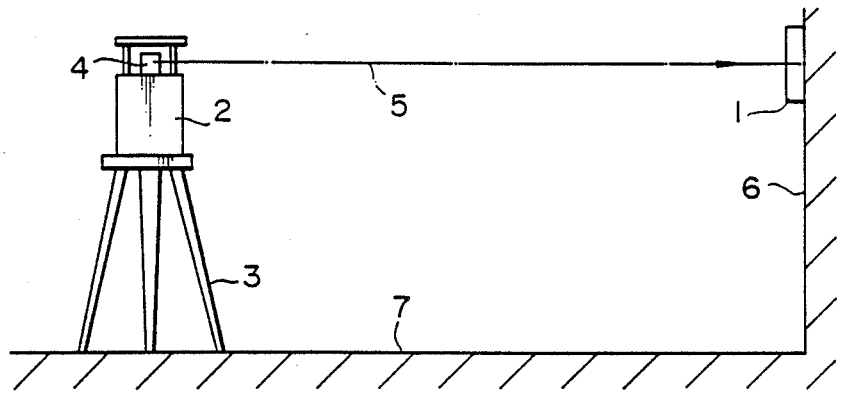
FIG. 3 is a diagrammatical side view illustrating the relation between the light detector and a laser beam surveying instrument.

The light detector 1 according to the present invention is used, for instance, in combination with a laser beam surveying instrument 2. As shown in FIG. 3, the laser beam surveying instrument 2 is placed on a tripod 3, and a laser beam generating unit 4 on the top portion of the instrument is rotatable around a perpendicular axis thereof so that a laser beam 5 emitted from the laser beam generating unit 4 as a measuring light beam may be scanned in a horizontal plane. On the other hand, the light detector 1 which is to receive the laser beam 5 emitted from the laser beam surveying instrument 2 is adapted to be attached to an appropriate upright face 6 such as a wall face. The light detector 1 may be moved along the upright face 6 to detect the height and the location of the center of the laser beam flux with reference to a standard plane 7.

Thereby, the height and the location of a point to be measured are measured by measuring the height and the location of the light detector 1, or a standard horizontal plane in which the laser beam is to be scanned is determined by appropriately marking the center of the light flux of the laser beam 5 on the opright face 6.

Figure 1:
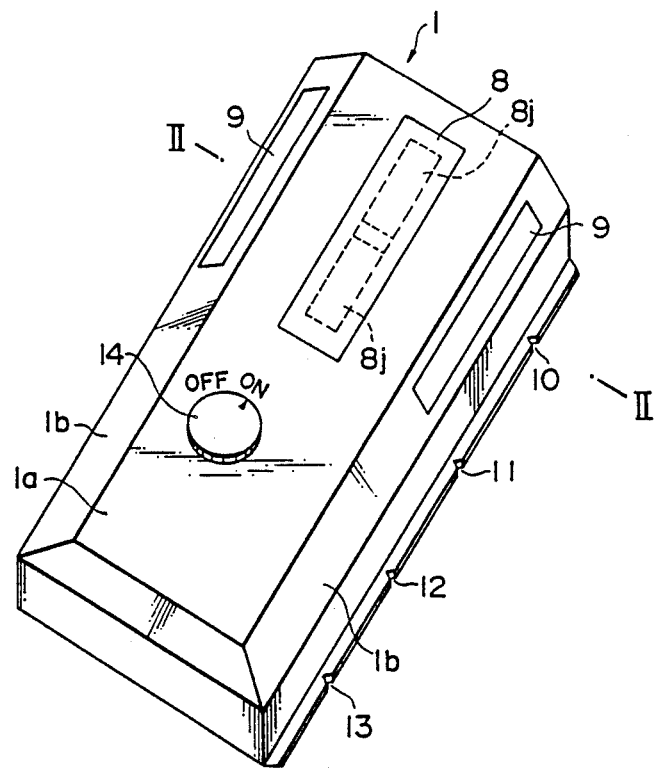
FIG. 1 is a perspective view illustrating an embodiment of the light detector according to the present invention.
Figure 2:
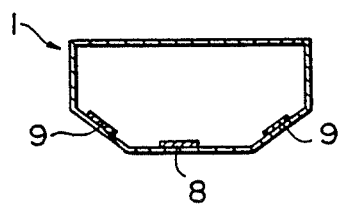
FIG. 2 is a sectional view of the light detector shown in FIG. 1 taken along a line II—II.

FIGS. 1 and 2 show the light detector 1 in detail. A light-receiving section 8 is provided on a front face 1$a$ on the front side for photoelectrically converting the measuring light beam entering therein. A light-receiving face of the light-receiving section 8 is contained in substantially the same plane as the front face 1$a$. A pair of inclined side faces 1$b$, 1$b$ are formed on the opposite sides of the front face 1$a$ while being continued thereto. The opposite side faces 1$b$, 1$b$ are located on the opposite sides of the front face 1$a$ and slightly inclined in such a manner that their back faces approach to each other toward the front face. Display segments 9 are formed on the respective side faces 1b, 1b. A displaying face of each of the display section 9 is contained in substantially the same plane as the side face 1b.

The light-receiving section 8 is constituted by a pair of upper and lower right-receiving segments 8j, 8j. A boundary portion between the light-receiving segments 8j,8j, that is, the central position of the light-receiving section 8, is a zone through which a standard horizontal plane of the laser beam 5 is to pass. A pair of center-locating notches 10, 10 are formed in a horizontal plane (on the right and left sides in FIG. 1) at opposite side edges of the light detector 1 (one of the notches is not shown in FIG. 1). First, second and third marking notches 11, 12 and 13 are formed at the opposite side edges under the center-locating notches 10, 10.

In FIG. 1, a reference numeral 14 denotes an operation switch to be actuated when in use.

Figure 4:
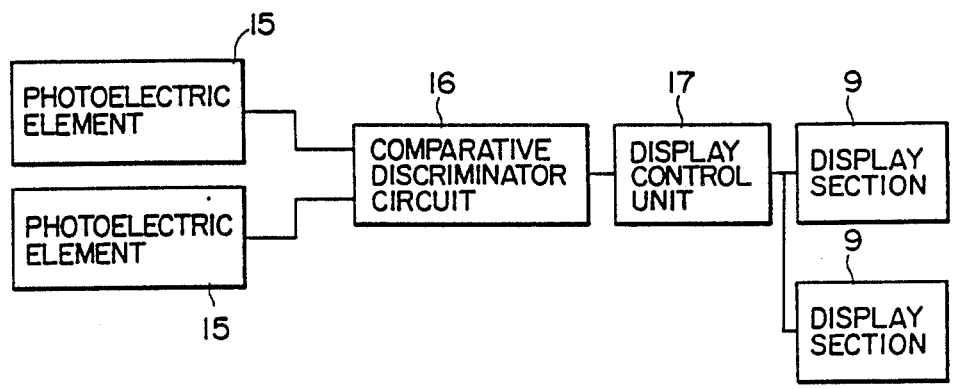
FIG. 4 is a circuit diagram showing the construction of the light detector.

FIG. 4 shows a circuit construction of the light detector 1. A pair of photoelectric elements constituting the light-receiving segments 8j, 8j are connected to a comparative discriminator circuit 16. The comparative discriminator circuit 16 is adapted to compare the magnitudes of received light amounts of the photoelectric elements and to output a discrimination result thereof. The comparative discriminator circuit 16 is connected to a display control unit 17, which is adapted to select a display pattern in compliance with the output from the comparative discriminator circuit 16. The display control unit 17 is connected to a display section 9 adapted to display the display pattern responsive to the output from the display control unit 17.

A use example of the thus constituted light detector will be next explained.

While carefully observing an indication of the display section 9, a surveying person moves the light detector 1 at an object to be surveyed in a direction orthogonal to the standard horizontal plane of the laser beam 5. At the same time, the center position of the laser beam 5 is determined by the following procedure.

Figures 5A, 5B, 5C:
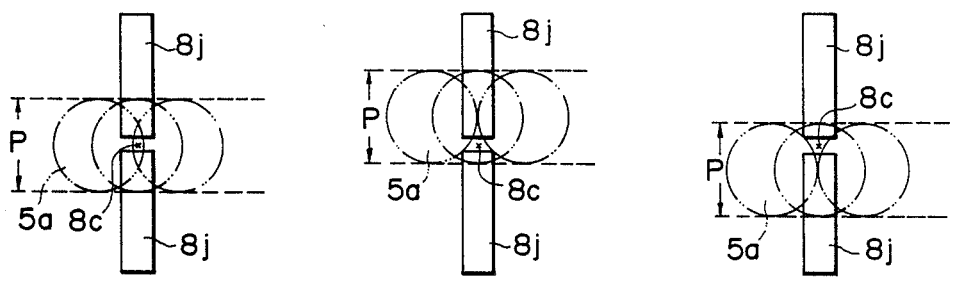
FIGS. 5($a$),($b$) and ($c$) are diagrammatical plane views illustrating the relation between the measuring light beam and the light-receiving section.
Figures 6A, 6B, 6C:
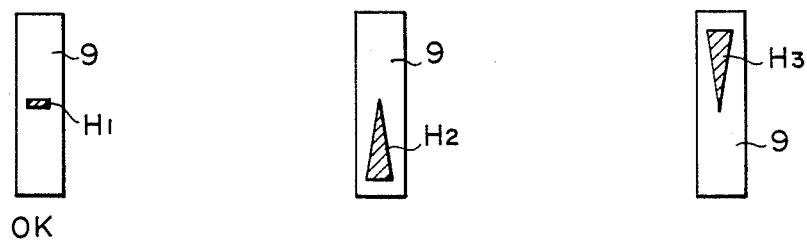
FIGS. 6($a$),($b$) and ($c$) are plane views illustrating display patterns in the display section.

As shown in FIG. 5(a), when the light flux 5a of the laser beam 5 equally enters both the light-receiving segments 8j, 8j, that is, when the center of the light flux-passing zone P of the laser beam passes through an intermediate point between the light-receiving segments 8j, 8j, i.e., the center point 8c of the light-receiving section 8, as shown in FIG. 6(a) a first display pattern H1 is indicated in the display section 9 to show that the center of the light flux 5a of the laser beam 5 coincides with the center point 8c of the light-receiving section 8 of the light detector 1.

As shown in FIG. 5 (b), when the light flux-passing zone P of the laser beam 5 is deviated into the light-receiving segment 8j shown upwards in this figure, as shown in FIG. 6(b), a second display pattern H2 is indicated in the display section 9 to show that the center of the light flux 5a of the laser beam 5 deviates above the center point 8c of the light receiving section 8. Therfore, in this case, the light detector 1 needs to be moved upwards.

Further, as shown in FIG. 5(c), when the light flux 5a of the laser beam 5 deviates into the light-receiving segment 8j shown downwards in this figure, as shown in FIG. 6(c), a third display pattern H3 is indicated in the display section 9 to show that the center of the light flux 5a of the laser beam 5 deviates under the center point 8c of the light-receiving section 8 of the light detector 1. Therefore, in this case, the light detector 1 needs to be moved downwards.

In each of the above cases, as shown in FIG. 2, the surveying person M can read the measurement results (the display patterns H1, H2, and H3) indicated in the display section 9 from the oblique side direction (both right and left sides) without exactly facing the front face 1a.

As having been described, according to the present invention, since a pair of the display segments which have the respective displaying faces along the side faces slightly inclined such that the side faces extend outside rearwardly are provided on the opposite sides of the light-receiving section, the surveying person can read the measurement result in the display section from both the oblique front opposite sides of the light detector. Therefore, the measurement can be always accurately performed from any direction without fear of the interruption of the measuring light beam as occurred in the conventional detectors. Thus, the present invention largely contributes to the prevention of measuring errors and enhancement of the measuring efficiency.

What is claimed is:

1. A light detector, defined by a housing having a front facing wall and opposite side walls extending from said front wall, comprising:

light-receiving section means, disposed in said front facing wall, for receiving a measuring light beam and for photoelectrically converting the light beam thus received and generating a signal in accordance therewith; and display section means for displaying a measurement result on the basis of said signal generated by said light-receiving section means, said display section means including at least two display segments disposed in at least a portion of respective ones of said opposite side walls, said portions of said sidewalls having said display sections disposed therein being inclined at an obtuse oblique angle with respect to said front facing wall such that each may be viewed by an observer without interrupting said measuring light beam.

2. A light detector according to claim 1, wherein said light-receiving section means includes upper and lower light-receiving segments vertically arranged in said front facing wall.

3. A light detector according to claim 2, wherein the upper and lower light receiving segments comprise photoelectric elements, said photoelectric elements being connected to a comparative discriminator circuit means, and said comparative discriminator circuit means being connected to said display sections through a display control section means.

4. A system for detecting a light beam transmitted from a remote location, comprising:

a light detector defined by a housing having a front facing wall and opposite sidewalls extending from said front facing wall, said housing being mounted on a vertical surface and said sidewalls extending obtusely and obliquely relative to a front surface of said front facing wall;

means for generating and directing a measuring light beam toward said front surface of said front facing wall from a remote location;

light-receiving section means, disposed in said front wall, for receiving said measuring light beam and for photoelectrically converting said received light beam into a signal; and at least two display segment means, disposed in respective ones of said oblique sidewalls, for displaying a measurement result in accordance with said signal generated by said light-receiving section means.

* * * * *